(12) United States Patent
Kim et al.

(10) Patent No.: US 11,613,845 B2
(45) Date of Patent: Mar. 28, 2023

(54) APPARATUS FOR MANUFACTURING ARTIFICIAL LEATHER AND METHOD OF MANUFACTURING ARTIFICIAL LEATHER USING THE SAME

(71) Applicant: LG HAUSYS, LTD., Seoul (KR)

(72) Inventors: Kitae Kim, Seoul (KR); Jun Hyoung Kim, Seoul (KR); Eun Sik Nam, Seoul (KR); Jae Bong Hwang, Seoul (KR)

(73) Assignee: LG Hausys, Ltd., Seoul (KR)

( * ) Notice: Subject to any disclaimer, the term of this patent is extended or adjusted under 35 U.S.C. 154(b) by 355 days.

(21) Appl. No.: 16/641,989

(22) PCT Filed: Sep. 11, 2018

(86) PCT No.: PCT/KR2018/010623
§ 371 (c)(1),
(2) Date: Feb. 25, 2020

(87) PCT Pub. No.: WO2019/054724
PCT Pub. Date: Mar. 21, 2019

(65) Prior Publication Data
US 2020/0354888 A1    Nov. 12, 2020

(30) Foreign Application Priority Data

Sep. 14, 2017 (KR) .................. 10-2017-0117553
Nov. 22, 2017 (KR) .................. 10-2017-0156751
Nov. 22, 2017 (KR) .................. 10-2017-0156753
Nov. 24, 2017 (KR) .................. 10-2017-0158895

(51) Int. Cl.
*B29C 59/04* (2006.01)
*B29C 59/06* (2006.01)
(Continued)

(52) U.S. Cl.
CPC ............. *D06N 3/14* (2013.01); *B29C 59/046* (2013.01); *B29C 59/06* (2013.01); *B32B 5/022* (2013.01);
(Continued)

(58) Field of Classification Search
CPC ....... B29C 59/00; B29C 59/002; B29C 59/02; B29C 59/04; B29C 59/046; B29C 59/06; B32B 5/022; B32B 5/024; B32B 5/18; B32B 5/245; B32B 27/065; B32B 27/304; B32B 38/0008; B32B 38/06;
(Continued)

(56) References Cited

U.S. PATENT DOCUMENTS

| 2015/0114062 A1* | 4/2015 | Spoto .................... B21B 27/005 72/46 |
| 2016/0221226 A1* | 8/2016 | Gerard .................. B29C 33/424 |
| 2017/0095831 A1* | 4/2017 | Sturm .................. B25J 11/0075 |

FOREIGN PATENT DOCUMENTS

| CN | 201089219 Y | 7/2008 | |
| DE | 1814720 A1 * | 7/1970 | ............. B29C 51/10 |

(Continued)

*Primary Examiner* — Michael A Tolin
(74) *Attorney, Agent, or Firm* — Dentons US LLP

(57) ABSTRACT

The present invention relates to an apparatus for manufacturing artificial leather, the apparatus including an embossing molding device capable of efficiently forming an embossed pattern on the surface of artificial leather through vacuum adsorption molding and a method of manufacturing artificial leather using the apparatus.

17 Claims, 10 Drawing Sheets

(51) Int. Cl.
- B32B 38/06 (2006.01)
- B32B 5/18 (2006.01)
- D06N 3/00 (2006.01)
- D06N 3/14 (2006.01)
- B32B 5/02 (2006.01)
- B32B 5/24 (2006.01)
- B32B 27/06 (2006.01)
- B32B 27/30 (2006.01)
- B32B 38/00 (2006.01)
- D06N 3/06 (2006.01)
- C09D 7/65 (2018.01)
- C09D 175/04 (2006.01)
- B60N 2/58 (2006.01)

(52) U.S. Cl.
CPC .............. *B32B 5/024* (2013.01); *B32B 5/18* (2013.01); *B32B 5/245* (2013.01); *B32B 27/065* (2013.01); *B32B 27/304* (2013.01); *B32B 38/0008* (2013.01); *B32B 38/06* (2013.01); *C09D 7/65* (2018.01); *C09D 175/04* (2013.01); *D06N 3/0077* (2013.01); *D06N 3/06* (2013.01); B32B 2266/0235 (2013.01); B32B 2601/00 (2013.01); B32B 2605/003 (2013.01); B32B 2605/08 (2013.01); B60N 2/5891 (2013.01); D06N 2211/28 (2013.01); D10B 2505/12 (2013.01)

(58) Field of Classification Search
CPC ........ B32B 2266/0235; B32B 2601/00; B32B 2605/003; B32B 2605/08; B32B 5/20; B60N 2/58; B60N 2/5891; C09D 7/65; C09D 175/04; D06N 3/0061; D06N 3/0077; D06N 3/0079; D06N 3/0081; D06N 3/06; D06N 3/065; D06N 3/128; D06N 3/14; D06N 3/144; D06N 2211/28; D10B 2505/12

See application file for complete search history.

(56) References Cited

FOREIGN PATENT DOCUMENTS

| | | |
|---|---|---|
| JP | 11-156929 A | 6/1999 |
| KR | 10-0328301 B1 | 3/2002 |
| KR | 10-2006-0047050 A | 5/2006 |
| KR | 1020060047050 A * | 5/2006 |
| KR | 10-2009-0078185 A | 7/2009 |
| KR | 10-1433089 B1 | 8/2014 |

* cited by examiner

[FIG. 1]
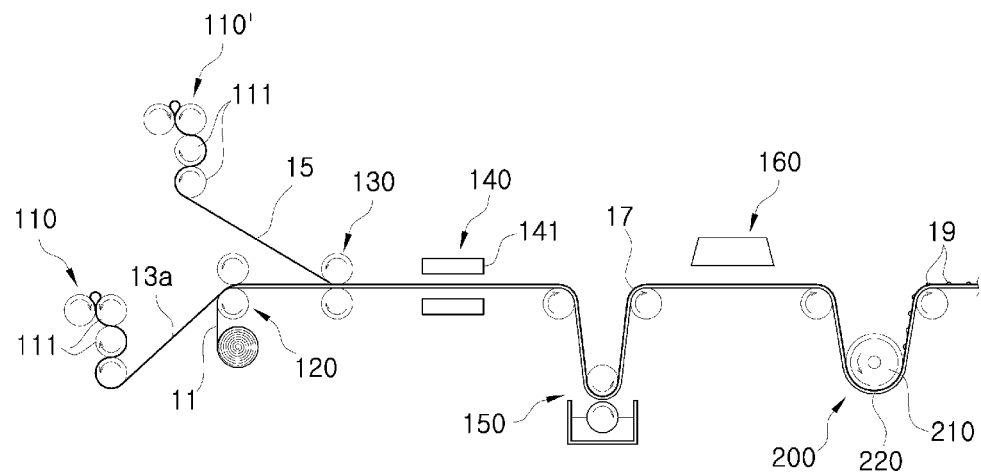

[FIG. 2]
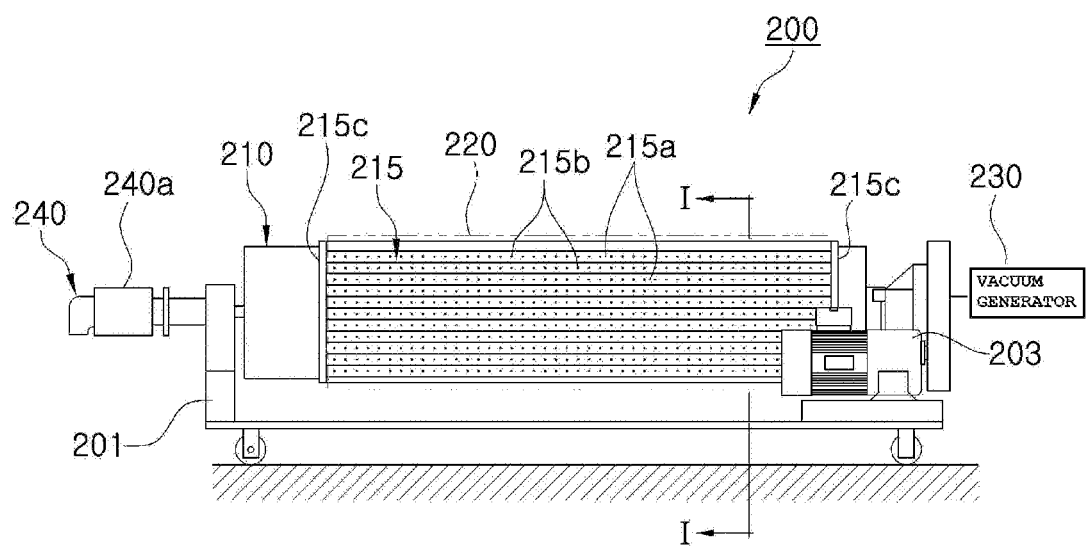

[FIG. 3]
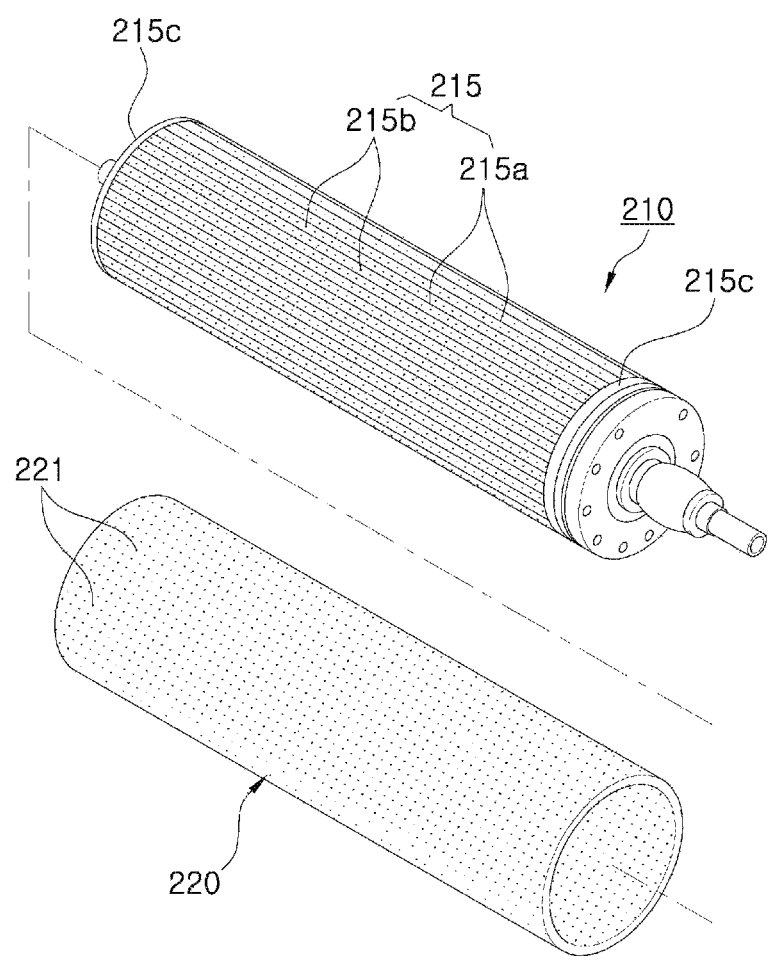

[FIG. 4]
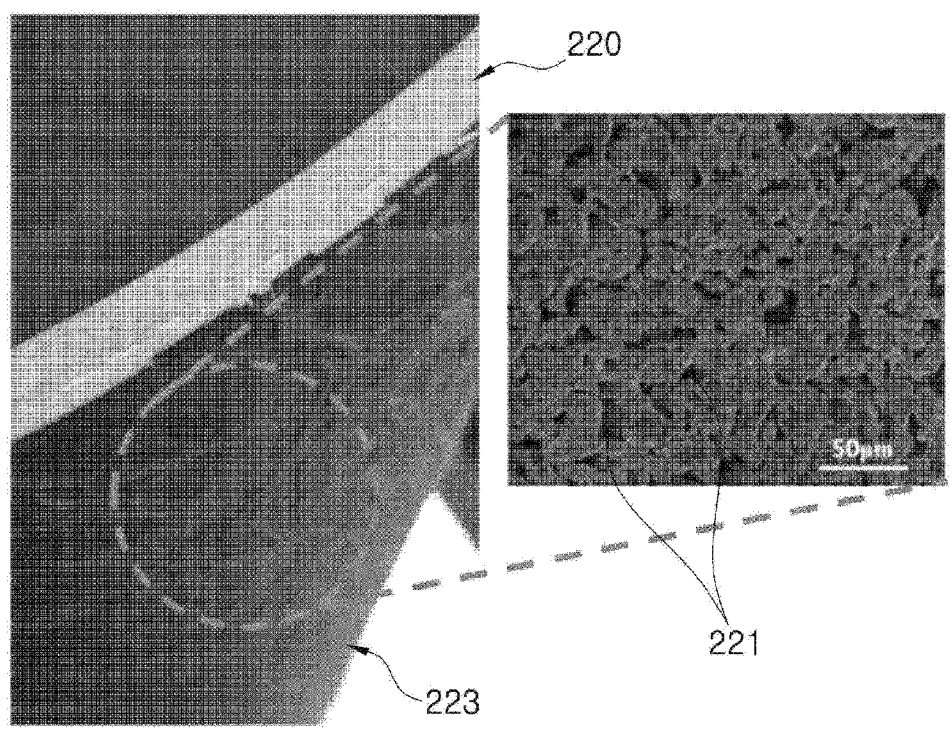

[FIG. 5]
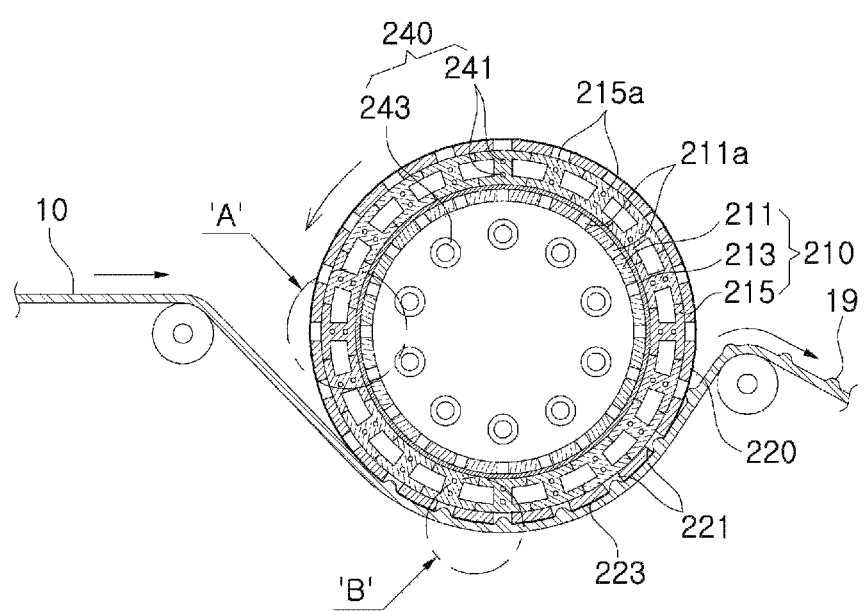

[FIG. 6]
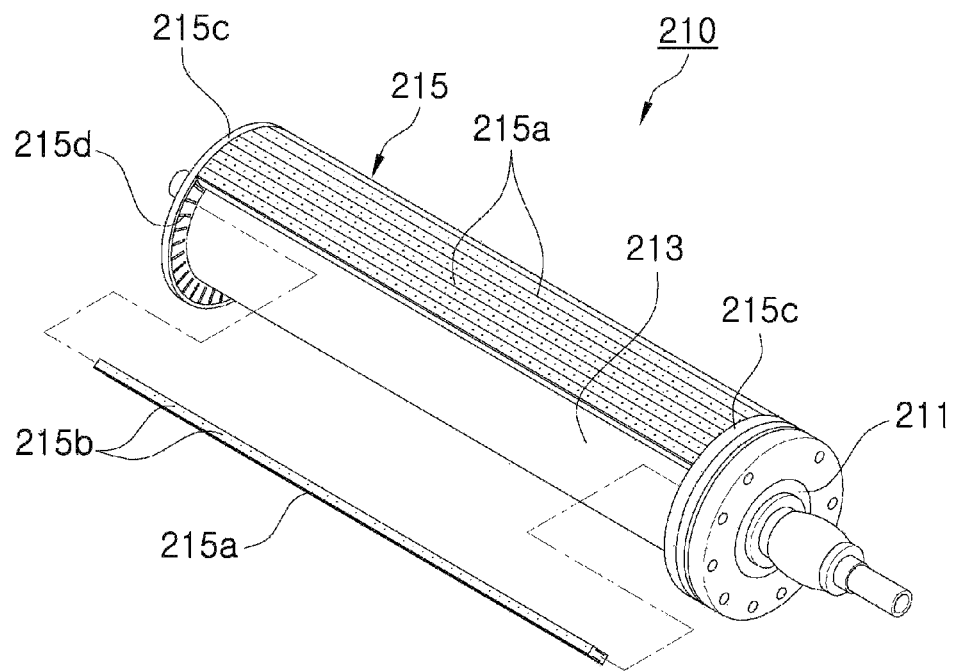

[FIG. 7]
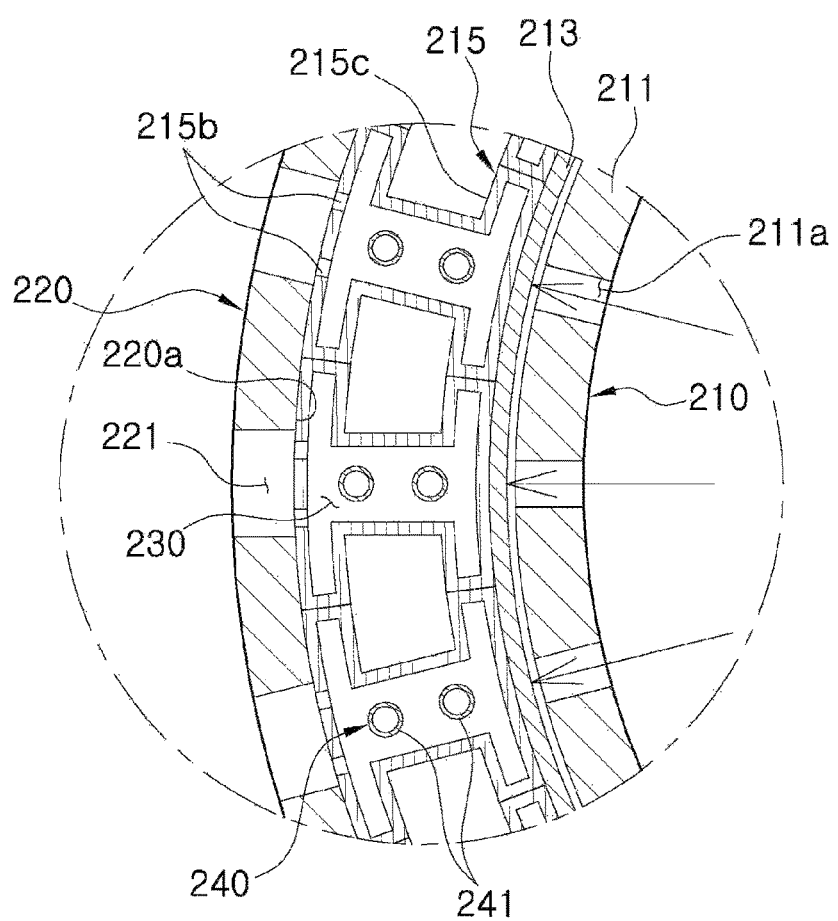

[FIG. 8]
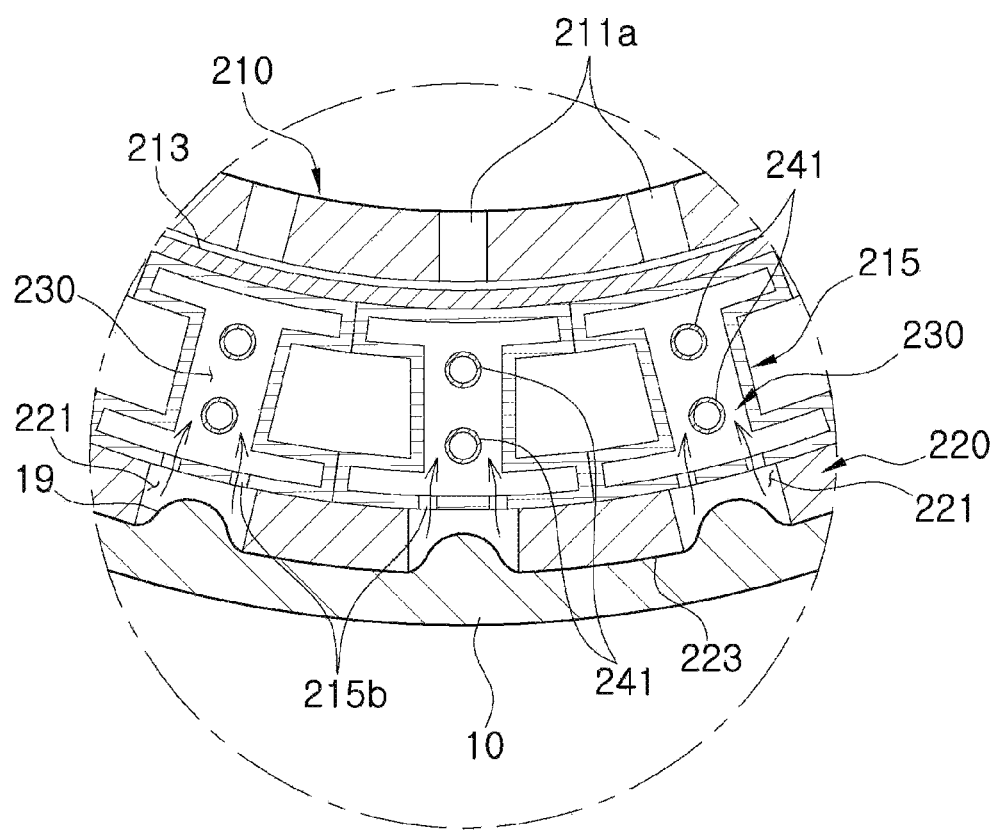

[FIG. 9]
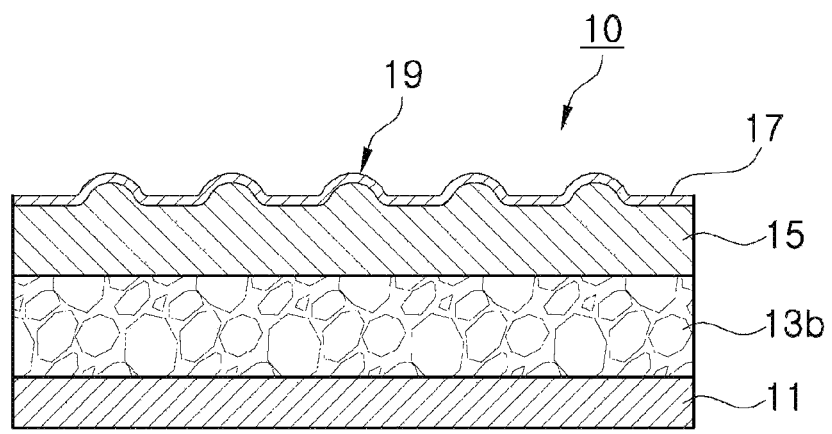

[FIG. 10]
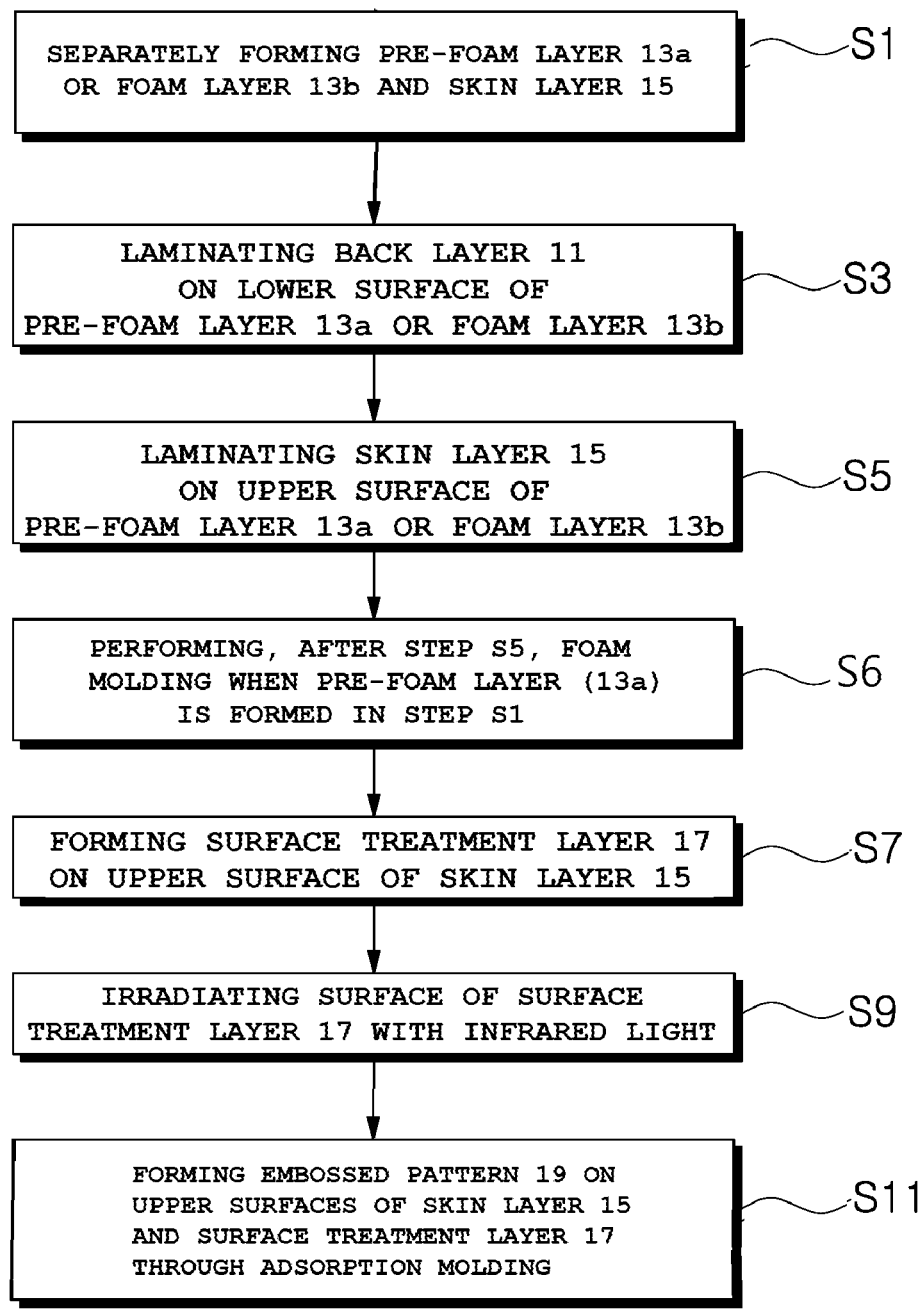

APPARATUS FOR MANUFACTURING ARTIFICIAL LEATHER AND METHOD OF MANUFACTURING ARTIFICIAL LEATHER USING THE SAME

This application is a National Stage Application of International Application No. PCT/KR2018/010623, filed on Sep. 11, 2018, and claims the benefit of and priority to Korean Patent Application No. 10-2017-0117553, filed on Sep. 14, 2017, Korean Patent Application No. 10-2017-0156751, filed on Nov. 22, 2017, Korean Patent Application No. 10-2017-0156753, filed on Nov. 22, 2017 and Korean Patent Application No. 10-2017-0158895, filed on Nov. 24, 2017, all of which are hereby incorporated by reference in their entirety for all purposes as if fully set forth herein.

TECHNICAL FIELD

The present invention relates to an apparatus for manufacturing artificial leather and a method of manufacturing artificial leather. More particularly, the present invention relates to an apparatus for manufacturing artificial leather, the apparatus including an embossing molding device capable of efficiently forming an embossed pattern on the surface of artificial leather through vacuum adsorption molding and a method of manufacturing artificial leather using the apparatus.

BACKGROUND ART

In general, the inside of an automobile is considered a second home. In recent years, as demand for a pleasant and comfortable driving environment in automobiles has increased, functional seats are attracting considerable attention.

Natural leather or polyvinyl chloride (PVC) and polyurethane (PU) artificial leathers are widely used as materials for automobile seats. Artificial leather is cheaper than natural leather. However, in terms of aesthetics and functionality that provides a pleasant driving environment, natural leather is remarkably superior to artificial leather.

Accordingly, efforts have been made to develop artificial leather that can satisfy the aesthetics and functionality of natural leather at a low cost. That is, in terms of functionality, natural leather has high moisture permeability. Due to this feature, natural leather can lower the surface temperature of seats in summer. More specifically, the moisture permeability of natural leather is high because moisture and heat are transmitted through pores formed in the surface and inside of the natural leather.

Artificial leather including a foam layer for realizing properties similar to natural leather was disclosed in KR 10-0328301 B1 (Publication date: Mar. 16, 2002).

Specifically, conventional artificial leather has a structure in which a back layer, a foam layer, a skin layer, and a surface treatment layer are laminated from the bottom to the top.

In this case, each of the foam layer and the skin layer is mainly formed of a polyvinyl chloride (PVC) material or a thermoplastic polyurethane (TPU) material and is laminated to have a predetermined thickness through calender molding. Then, through a foaming process, the foam layer is foam-molded at a certain magnification.

In addition, to impart texture and cushioning similar to natural leather, an embossed pattern is formed on the skin layer.

Conventionally, embossing molding using roller pressing is used to form an embossed pattern. Specifically, a semi-finished product in which a foam layer and a skin layer are laminated is passed between rotating rollers so that an embossed pattern is transferred onto the semi-finished product.

However, in the case of conventional embossing molding using roller pressing, foam cells contained in a foam layer have irregular shapes and are formed in small numbers. In particular, due to pressurization by an embossing roll, foam cells have a distorted shape, i.e., a closed cell form, rather than a circular shape.

In addition, according to the conventional embossing molding process, immediately after a foaming process, an embossed pattern is formed on the upper surface of the skin layer of heated artificial leather while an embossing roll is in constant contact with the heated artificial leather. As a result, the temperature of the embossing roll is increased.

Meanwhile, in order for embossing molding to be performed properly, the temperature of an embossing roll must be maintained at an appropriate level. Conventionally, an air cooling type cooling device is applied to an embossing roll to maintain an appropriate temperature. In the case of the air-cooled type embossing roll, a predetermined cooling time is required.

As described above, according to the conventional method of manufacturing artificial leather, since the processing speed of embossing molding and the processing speed of steps before embossing molding are inconsistent with each other, embossing molding and other steps must be performed separately using separate equipment. As a result, the production efficiency of artificial leather is reduced.

DISCLOSURE

Technical Problem

Therefore, the present invention has been made in view of the above problems, and it is one object of the present invention to provide an apparatus for manufacturing artificial leather and a method of manufacturing artificial leather. According to the present invention, since an embossed pattern is formed on the skin layer of artificial leather using an embossing roll to which vacuum adsorption molding is applied, foam cells constituting a foam layer may be prevented from being distorted or damaged. In addition, since cooling of an embossing roll provided in an embossing molding device is performed in a water cooling manner instead of a conventional air cooling manner, the cooling rate of the embossing roll may be increased. Accordingly, the embossing molding device and a conventional apparatus for manufacturing artificial leather may be applied together in an in-line manner.

Technical Solution

In accordance with one aspect of the present invention, provided is an embossing molding device including a roller body (210) that is formed in a cylindrical shape and is rotated by power transmitted from a motor (203); an embossing roller (220) formed in a tubular shape so as to be coupled to an outer circumferential surface of the roller body (210) and provided with vacuum holes (221) for embossing molding and a predetermined pattern for embossing (223) on a surface thereof; a vacuum generator (230) that is connected to the vacuum holes (221) through the roller body (210) and is responsible for generating vacuum to form, through adsorption molding, an embossed pattern (19) on a surface of artificial leather being introduced and conveyed; and a water cooling-type cooler (240) that is installed inside the roller body (210) and is responsible for cooling the embossing roller (220) to a predetermined temperature.

In accordance with another aspect of the present invention, provided is an apparatus for manufacturing artificial leather, the apparatus including an embossing molding unit (200) for forming an embossed pattern (19) on an upper surface of a skin layer (15) of a foam-molded semi-finished product by performing adsorption molding using the embossing molding device using vacuum.

In accordance with yet another aspect of the present invention, provided is a method of manufacturing artificial leather including step S1 of separately forming a pre-foam layer (13a) or a foam layer (13b) and a skin layer (15) by molding; step S3 of laminating woven fabric or nonwoven fabric on a lower surface of the pre-foam layer (13a) or the foam layer (13b) to form a back layer (11); step S5 of laminating the skin layer (15) on an upper surface of the pre-foam layer (13a) or the foam layer (13b) on which the back layer (11) has been formed; step S7 of forming a surface treatment layer (17) on an upper surface of the skin layer (15); step S9 of radiating infrared light on a surface of the surface treatment layer (17); and step S11 of forming an embossed pattern (19) on upper surfaces of the skin layer (15) and the surface treatment layer (17) of a semi-finished product heated by irradiation with infrared light by performing adsorption molding using the embossing molding device using vacuum.

Advantageous Effects

According to the present invention having the above configuration, since cooling of an embossing roll provided in an embossing molding device is performed in a water cooling manner instead of a conventional air cooling manner, the cooling rate of the embossing roll can be increased. Accordingly, in a process of manufacturing artificial leather, a surface treatment unit and an embossing molding unit can be configured in line, thereby improving production efficiency.

In addition, in artificial leather of the present invention, since foam cells constituting a foam layer are prevented from being distorted or damaged, excellent cushioning can be realized.

DESCRIPTION OF DRAWINGS

FIG. 1 is a schematic diagram showing an apparatus for manufacturing artificial leather according to one embodiment of the present invention.

FIG. 2 is a front view showing the overall structure of an embossing molding device using vacuum according to one embodiment of the present invention.

FIG. 3 is an exploded perspective view showing a coupling state between a roller body and an embossing roller according to one embodiment of the present invention.

FIG. 4 includes images showing an embossing roller according to one embodiment of the present invention.

FIG. 5 is a cross-sectional view taken along line I-I shown in FIG. 3.

FIG. 6 is a drawing showing the structure of a vacuum bar assembly according to one embodiment of the present invention.

FIG. 7 is a detail view of part 'A' shown in FIG. 5.

FIG. 8 is a detail view of part 'B' shown in FIG. 5.

FIG. 9 is a side cross-sectional view showing the laminated structure of artificial leather according to one embodiment of the present invention.

FIG. 10 is a flowchart for explaining a process of manufacturing artificial leather using an apparatus for manufacturing artificial leather according to one embodiment of the present invention.

BEST MODE

Hereinafter, the functions or constructions of preferred embodiments of the present invention will now be described more fully with reference to the accompanying drawings.

Here, when reference numerals are applied to constituents illustrated in each drawing, it should be noted that like reference numerals indicate like elements throughout the specification.

FIG. 1 is a schematic diagram showing an apparatus for manufacturing artificial leather according to one embodiment of the present invention.

Referring to FIG. 1, the apparatus for manufacturing artificial leather according to a preferred embodiment of the present invention includes an embossing molding unit 200 for forming an embossed pattern 19 on the upper surface of the skin layer 15 of a foam-molded semi-finished product through vacuum adsorption molding using an embossing molding device.

In this case, the apparatus may include, at a position ahead of the embossing molding unit 200, a surface treatment unit 150 for forming a surface treatment layer 17 on the upper surface of the skin layer 15, and the surface treatment unit 150 and the embossing molding unit 200 may be arranged in line.

In addition, the apparatus for manufacturing artificial leather according to the present invention may include, at positions ahead of the surface treatment unit 150, a first molding unit 100 for forming a pre-foam layer 13a or a foam layer 13b, a second molding unit 100' for forming the skin layer 15, a back layer lamination unit 120 for laminating woven fabric or nonwoven fabric on the lower surface of the pre-foam layer 13a or the foam layer 13b to form a back layer 11, and a skin layer lamination unit 130 for laminating the skin layer 15 on the upper surface of the pre-foam layer 13a or the foam layer 13b.

In one embodiment, the first molding unit 100 and the second molding unit 100' may be configured in a calendering molding manner. In this case, calendering molding may be a calendering process of separately kneading a composition for preparing the pre-foam layer 13a or the foam layer 13b and a composition for preparing the skin layer 15 in a mixer and passing the compositions between calender rolls 111 at 160 to 170° C.

In another embodiment, the first molding unit 100 and the second molding unit 100' may be configured in such a manner that each layer is separately formed through extrusion molding. In this case, extrusion molding may be a T-die extrusion process using a T-die extruder after separately melting a composition for preparing the pre-foam layer 13a or the foam layer 13b and a composition for preparing the skin layer 15 in an extruder.

Hereinafter, a case wherein calendering molding is applied to the first molding unit 100 for forming the pre-foam layer 13a or the foam layer 13b and the second molding unit 100' for forming the skin layer 15 will be described, but the present invention is not limited thereto.

Meanwhile, in the case of forming the pre-foam layer 13a among the pre-foam layer 13a and the foam layer 13b in the first molding unit 100, the apparatus of the present invention may include a foam molding unit 140 for forming the foam layer 13*b* by passing a semi-finished product on which the skin layer 15 is laminated through an oven 141 to foam the pre-foam layer 13*a* including a foaming agent at a certain magnification.

In addition, the apparatus of the present invention may include, between the surface treatment unit 150 and the embossing molding unit 200, an infrared light heating unit 160 for radiating infrared light to the surface of a semi-finished product on which the surface treatment layer 17 is laminated and heating the surface of the semi-finished product.

Specifically, the infrared light heating unit 160 is preferably configured so that an artificial leather semi-finished product being conveyed at a predetermined speed is efficiently heated and softened at a temperature of 150 to 180° C., preferably 160 to 170° C., and radiation time of infrared light is 5 to 15 seconds or 10 to 15 seconds.

For example, when the processing speed of a semi-finished product is 13 to 17 m/min, preferably 15 m/min, the infrared light heating unit 160 is preferably configured to have a length of 3 to 4 m in the conveying direction of the semi-finished product.

That is, when the infrared light heating unit 160 is configured to be too short, radiation of infrared light is not sufficient. As a result, a semi-finished product may not be preheated to be suitable for embossing molding. For example, when the infrared light heating unit 160 is configured to have a short length and heating temperature is set to 190° C. or more, the skin layer 15 of a semi-finished product may melt and be damaged.

The infrared light heating unit 160 may be configured to have a long length and heating temperature may be set low. In this case, installation cost is significantly increased. In addition, when processing speed is reduced, even when the infrared light heating unit 160 is configured to have a length of 3 m or less, a semi-finished product may be irradiated with a required amount of infrared light. In this case, there is no limitation on the lower limit thereof. In the present invention, preferred processing speed is 12 to 15 m/min. In this case, the most suitable length is 3 to 4 m. For example, when processing speed is 15 m/min, the length of a zone irradiated with infrared light is preferably 3.5 m.

In addition, in another embodiment, the surface treatment unit 150 may be disposed at a position behind the embossing molding unit 200, and the surface treatment unit 150 and the embossing molding unit 200 may be arranged in line or out line.

Preferably, the surface treatment unit 150 is disposed between the foam molding unit 140 and the embossing molding unit 200, and the surface treatment unit 150 is configured to be placed in line with the foam molding unit 140 and the embossing molding unit 200. With this configuration, the thickness of the surface treatment layer 17 may be uniform, and thus, excellent appearance without stains may be realized.

In another embodiment, the foam molding unit 140, the surface treatment unit 150, the infrared light heating unit 160, and the embossing molding unit 200 may be arranged in line.

In another embodiment, the first molding unit 100 for forming the pre-foam layer 13*a*, the second molding unit 100' for forming the skin layer 15, the back layer lamination unit 120, the skin layer lamination unit 130, the foam molding unit 140, the surface treatment unit 150, the infrared light heating unit 160, and the embossing molding unit 200 may be arranged in line.

FIG. 2 is a front view showing the overall structure of an embossing molding device using vacuum according to one embodiment of the present invention.

Referring to FIG. 2, the embossing molding device constituting the embossing molding unit 200 according to the present invention includes a roller body 210, an embossing roller 220, a vacuum generator 230, and a water cooling-type cooler 240.

The configuration of the present invention will be described in detail as follows.

First, the roller body 210 is formed in a cylindrical shape and is rotatably mounted on a support 201. The roller body 210 is rotated at a predetermined speed by power transmitted from a motor 203.

The embossing roller 220 serves to form the embossed pattern 19 on the surface of the skin layer 15 of an artificial leather 10 being conveyed and introduced in a semi-finished form. The embossing roller 220 is formed in a tubular shape so as to be coupled to the outer circumferential surface of the roller body 210.

Referring to FIGS. 3 and 4, on the outer circumferential surface of the embossing roller 220, vacuum holes 221 for embossing molding and a predetermined pattern for embossing 223 are provided (see FIG. 4).

In this case, the vacuum holes 221 may be formed in the embossing roller 220 to penetrate the embossing roller 220 through a separate process. Alternatively, the embossing roller 220 may be a porous roller, and holes formed therein may serve as the vacuum holes 221. In the present invention, a case wherein the embossing roller 220 is a porous roller, and holes formed therein serve as the vacuum holes 221 will be described, but the present invention is not limited thereto.

The embossing roller 220 is provided in plural so as to manufacture the artificial leather 10 by selectively applying the predetermined pattern for embossing 223 desired by a user. That is, any one of the embossing rollers 220 is detachably coupled to the outer circumferential surface of the roller body 210 and may be replaced with another one.

To implement this, the roller body 210 is configured so that the embossing roller 220 is integrally fixed to the roller body 210 and the embossing roller 220 is capable of being replaced.

Referring to FIG. 5, the roller body 210 includes a main roller 211 for injecting air outside through a plurality of injection holes 211*a* provided in the outer circumferential surface of the main roller 211 when air is fed from an air feeder (not shown), a tube-shaped rubber cover 213 that is fitted into the outer circumferential surface of the main roller 211 and is expanded outward by pressure due to air injected through the injection holes 211*a*, and a vacuum bar assembly 215 that is provided with a plurality of vacuum bars 215*a* bonded radially to the outer circumferential surface of the rubber cover 213 about the central axis of the main roller 211 and is provided with, on the outer circumferential surface of the vacuum bar assembly 215, a plurality of suction holes 215*b* in communication with the vacuum holes 221.

Referring to FIG. 6, a pair of fixing plates 215*c* is coupled to both sides of the main roller 211. In this case, coupling grooves 215*d* are formed on the opposing surfaces of the fixing plates 215*c* to fix both ends of the vacuum bars 215*a*. Thus, the vacuum bars 215*a* may be fitted radially into the outer circumferential surface of the main roller 211.

In this case, the vacuum bars 215*a* are preferably formed of an aluminum alloy.

In addition, the embossing roller 220 is loosely fitted into the outer circumferential surface of the vacuum bar assembly 215 to allow replacement of the embossing roller 220 when the air feeder is not in operation.

The embossing roller 220 is preferably formed of a ceramic material having higher heat resistance and hardness than metals. Specifically, the embossing roller 220 may be formed of a material including silicon dioxide ($SiO_2$), a curing agent, and glass fiber.

Referring to FIG. 7, in the roller body 210 having such a configuration, upon feeding air from the air feeder, as the rubber cover 213 expands, the vacuum bar assembly 215 expands radially. Accordingly, an inner circumferential surface 220a of the embossing roller 220 is pressed by the expanded vacuum bar assembly 215, so that the replaced embossing roller 220 may be firmly fixed.

Referring to FIG. 8, the vacuum generator 230 is connected to the vacuum holes 221 of the embossing roller 220 through the suction holes 215b of the vacuum bars 215a constituting the roller body 210, and forms the embossed pattern 19 on the surface of the artificial leather 10 in a semi-finished form, which is being introduced and conveyed, through vacuum adsorption molding.

That is, in a state wherein the embossing roller 220 having an outer circumferential surface on which the pattern for embossing 223 is formed and the surface of the artificial leather 10 are in contact with each other, the embossed pattern 19 may be formed on the surface of the artificial leather 10 through vacuum adsorption molding by the vacuum generator 230.

In this case, the shapes of the vacuum holes 221 and the embossed pattern 19 shown in the drawing are exaggerated forms of the actual shapes thereof to easily explain the principle of adsorption molding using vacuum, and thus the actual shapes may be different.

The water cooling-type cooler 240 serves to cool the embossing roller 220 installed in the roller body 210 to a predetermined temperature.

That is, in an embossing molding process, the embossed pattern 19 is formed through molding in a state wherein the embossing roller 220 continuously contacts the surface of the heated artificial leather 10 immediately after a foaming process. As a result, the temperatures of the roller body 210 and the embossing roller 220 are increased above an optimum value. Accordingly, it is necessary to reduce the temperature of the embossing roller 220 to a predetermined temperature or less through the water cooling-type cooler 240.

Specifically, the water cooling-type cooler 240 includes first cooling water pipes 241 provided longitudinally inside the vacuum bars 215a to circulate cooling water fed from a cooling water feeder 240a.

In addition, the first cooling water pipes 241 may be connected to second cooling water pipes 243 provided inside the main roller 211 to circulate cooling water (see FIG. 5). With this configuration, cooling efficiency may be improved.

Through the water cooling-type cooler 240 having such a structure, the embossing roller 220 may be cooled so that the temperature thereof is reduced to an appropriate temperature of 60 to 80° C.

Hereinafter, the laminated structure of the artificial leather 10 manufactured using the apparatus for manufacturing artificial leather according to a preferred embodiment of the present invention will be described.

Referring to FIG. 9, the artificial leather 10 may include the back layer 11, the foam layer 13b, the skin layer 15, and the surface treatment layer 17, which are laminated from the bottom to the top. In this case, the embossed pattern 19 may be formed on upper surfaces of the skin layer 15 and the surface treatment layer 17.

In more detail, the back layer 11 of the present invention serves to maintain the shape of the artificial leather and to prevent generation of wrinkles in the artificial leather, thereby improving mechanical properties of the artificial leather. The back layer 11 may be formed of flexible polymers, such as woven fabric, nonwoven fabric, knitted fabric, plain weave, and spun-bonded fabric, made of various composites based on cotton, rayon, silk, polyolefins (e.g., polyethylene, polypropylene, etc.), nylon, polyesters, polyurethanes, and the like, and may optionally further include natural fiber and/or synthetic fiber.

The foam layer 13b serves to impart soft properties and cushioning to artificial leather and may be formed of a composition for preparing a foam layer. In this case, the composition may include a thermoplastic resin, a plasticizer, and a foaming agent.

In this case, the thermoplastic resin may be a PVC resin capable of achieving excellent cushioning and durability and high elongation at the same time.

The skin layer 15 serves to secure surface smoothness and implement color and may be formed of a composition for preparing a skin layer. In this case, the composition may include a thermoplastic resin, a plasticizer, and a pigment.

In addition, to adjust melt strength and physical properties, the composition for preparing the skin layer 15 may further include a heat stabilizer, a flame retardant, and a filler.

The skin layer 15 may be coated with a two liquid-type water-based surface treatment agent, dried, and aged to form the surface treatment layer 17.

Specifically, by applying the two liquid-type water-based surface treatment agent to the upper surface of the skin layer 15, the surface treatment layer 17 having a thickness of 4 to 30 μm may be formed. By maintaining the thickness of the surface treatment layer 17 within the above range, contamination resistance may be secured while maintaining the flexibility of artificial leather. When the thickness of the surface treatment layer 17 is below the above range, the surface treatment layer 17 becomes too thin, resulting in poor durability. When the thickness of the surface treatment layer 17 exceeds the above range, the amount of a water-based surface treatment agent to be added may be increased, thereby increasing material cost. Thus, the surface treatment layer 17 is preferably formed to have a thickness within the above range.

The embossed pattern 19 may be formed on the surfaces of the skin layer 15 and the surface treatment layer 17 of a semi-finished product heated by irradiation with infrared light and may be formed in a predetermined embossed pattern by the embossing molding device according to the present invention.

Then, a process of manufacturing the artificial leather 10 having such a laminated structure will be described.

FIG. 10 is a flowchart for explaining a process of manufacturing artificial leather using an apparatus for manufacturing artificial leather according to one embodiment of the present invention.

Referring to FIG. 10, first, the pre-foam layer 13a or the foam layer 13b and the skin layer 15 are separately formed through the first molding unit 100 and the second molding unit 100' (step S1).

Then, woven fabric or nonwoven fabric is laminated on the lower surface of the pre-foam layer 13a or the foam layer 13b to form the back layer 11 (step S3).

Then, the skin layer 15 is laminated on the upper surface of the pre-foam layer 13a or the foam layer 13b on which the back layer 11 has been formed (step S5).

In this case, when the pre-foam layer 13a is formed through the first molding unit 100, a semi-finished product after the step of laminating the skin layer 15 is passed through the oven 141 and the pre-foam layer 13a including a foaming agent is foamed at a certain magnification to form the foam layer 13b (step S6).

Then, a surface treatment agent is applied to the upper surface of the skin layer 15 to form the surface treatment layer 17 (step S7).

Then, the surface of a semi-finished product on which the surface treatment layer 17 has been formed is irradiated with infrared light to heat the surface of the semi-finished product (step S9).

Finally, by forming, through vacuum adsorption molding, the embossed pattern 19 on the upper surfaces of the skin layer 15 and the surface treatment layer 17 of the semi-finished product heated by irradiation with infrared light, manufacture of the artificial leather according to the present invention is completed (step S13).

In this case, in the method of manufacturing artificial leather according to one embodiment of the present invention, step S6 (foam molding step), step S7 (surface treatment layer forming step), step S9 (infrared light radiating step), and step S11 (embossing molding step) may be performed in an in-line manner.

Alternatively, step S1 (pre-foam layer or foam layer and skin layer molding step), step S3 (back layer lamination step), step S5 (skin layer lamination step), step S6 (foam molding step), step S7 (surface treatment layer forming step), step S9 (infrared light radiating step), and step S11 (embossing molding step) may be performed in an in-line manner.

In this case, step S11 (embossing molding step) of forming the embossed pattern 19 through vacuum adsorption molding is preferably performed under a pressure of 0.02 to 0.08 MPa, preferably 0.04 to 0.07 MPa. When step S11 is performed under a pressure below the above range, the embossed pattern 19 may not be clearly formed, resulting in poor cushioning. When step S11 is performed under a pressure exceeding the above range, the surface treatment layer 17 may be damaged, or surface physical properties may be degraded. Thus, step S11 is preferably performed under a pressure within the above range.

In addition, step S11 (embossing molding step) may be performed at a temperature of 150 to 190° C., preferably 160 to 180° C. When step S11 is performed at a temperature below the above range, the embossed pattern 19 may not be sufficiently formed. When step S11 is performed at a temperature exceeding the above range, the surface physical properties of artificial leather may be degraded due to high temperature, and thus the surface thereof may be rough or torn. Thus, step S11 is preferably performed at a temperature within the above range.

Alternatively, the upper surface of the skin layer 15 of a foamed semi-finished product may be irradiated with infrared light, the embossed pattern 19 may be formed on the surface of the skin layer 15 of the heated semi-finished product through vacuum adsorption molding, and then a surface treatment agent may be applied to the skin layer 15 to form the surface treatment layer 17. Through this process, artificial leather may be manufactured.

According to the present invention, since cooling of an embossing roll provided in an embossing molding device is performed in a water cooling manner instead of a conventional air cooling manner, the cooling rate of the embossing roll may be increased. Accordingly, in a process of manufacturing artificial leather, the surface treatment unit 150 and the embossing molding unit 200 may be configured in line, thereby improving production efficiency.

More specifically, the molding speed of the embossed pattern 19 according to methods of cooling the embossing roller 220 will be described.

The embossing molding rates in Example in which artificial leather is manufactured using an embossing molding device including the water cooling-type cooler 240 according to the present invention and Comparative Example in which artificial leather is manufactured using a conventional embossing molding device including an air cooling-type cooler are shown in Table 1 below.

TABLE 1

|  | Example | Comparative Example |
|---|---|---|
| Production rate [m/min] | ~30 | ~9 |

As shown in Table 1, in the case of Example in which an embossing molding device including the water cooling-type cooler 240 according to the present invention is used, the embossing molding rate is about 3.3 times faster than Comparative Example in which an embossing molding device including an air cooling-type cooler is used.

In addition, in the case of the conventional embossing molding device including an air cooling-type cooler of Comparative Example, it takes considerable time to cool an embossing roll. That is, the conventional embossing molding device may not be provided in line with other devices constituting an apparatus for manufacturing artificial leather because the production rate of the conventional embossing molding device is different from the production rate of the above other devices.

In contrast, in the case of the embossing molding device including the water cooling-type cooler 240 according to the present invention, the cooling rate of an embossing roll is increased compared to the conventional embossing molding device. That is, since the production rate of the embossing molding device of the present invention may match the production rates of other devices constituting an apparatus for manufacturing artificial leather, the embossing molding device and the above other devices may be provided in line. Accordingly, the production efficiency of artificial leather may be improved.

In addition, compared to the conventional roll pressing-type embossing molding device having an embossed pattern transfer efficiency of 80 to 90%, the embossing molding device using vacuum according to the present invention may implement an embossed pattern transfer efficiency of 100%.

As described above, the present invention has been described with reference to certain preferred embodiments, but the present invention is not limited to the above-described embodiments, and various changes and modifications may be made without departing from the spirit of the present invention.

[Description of Symbols]

| | |
|---|---|
| 10: ARTIFICIAL LEATHER | 11: BACK LAYER |
| 13a: PRE-FOAM LAYER | 13b: FOAM LAYER |
| 15: SKIN LAYER | 17: SURFACE TREATMENT LAYER |
| 19: EMBOSSED PATTERN | 110: FIRST MOLDING UNIT |
| 110': SECOND MOLDING UNIT | 111: CALENDER ROLLS |
| 120: BACK LAYER LAMINATION UNIT | 130: SKIN LAYER LAMINATION UNIT |
| 140: FOAM MOLDING UNIT | 141: OVEN |
| 150: SURFACE TREATMENT UNIT | 160: INFRARED LIGHT HEATING UNIT |
| 200: EMBOSSING MOLDING UNIT | 210: ROLLER BODY |
| 211: MAIN ROLLER | 211A: INJECTION HOLES |
| 213: RUBBER COVER | 215: VACUUM BAR ASSEMBLY |
| 215A: VACUUM BARS | 215B: SUCTION HOLES |
| 215C: FIXING PLATES | 215D: COUPLING GROOVES |
| 220: EMBOSSING ROLLER | 221: VACUUM HOLES |
| 223: EMBOSSING PATTERN | 230: VACUUM GENERATOR |
| 240: WATER COOLING-TYPE COOLER | 241: FIRST COOLING WATER PIPES |
| 243: SECOND COOLING WATER PIPES | |

The invention claimed is:

1. An embossing molding device, comprising:
a roller body that is formed in a cylindrical shape and is rotated by power transmitted from a motor;
an embossing roller formed in a tubular shape so as to be coupled to an outer circumferential surface of the roller body and provided with vacuum holes for embossing molding and a predetermined pattern for embossing on a surface thereof;
a vacuum generator that is connected to the vacuum holes through the roller body and is responsible for generating vacuum to form, through adsorption molding, an embossed pattern on a surface of artificial leather being introduced and conveyed; and
a water cooler that is installed inside the roller body and is responsible for cooling the embossing roller to a predetermined temperature,
wherein the roller body comprises: a main roller for injecting air outside through a plurality of injection holes provided in an outer circumferential surface of the main roller when air is fed from an air feeder; a tube-shaped rubber cover that is fitted onto the outer circumferential surface of the main roller and is expanded outward by pressure due to air injected through the plurality of injection holes; and a vacuum bar assembly that is provided with a plurality of vacuum bars bonded radially to an outer circumferential surface of the rubber cover about a central axis of the main roller and is provided with, on an outer circumferential surface of the vacuum bar assembly, a plurality of suction holes in communication with the vacuum holes, and
wherein, upon expansion of the rubber cover, the vacuum bar assembly expands to press and fix an inner circumferential surface of the embossing roller.

2. The embossing molding device according to claim 1, wherein a pair of fixing plates is coupled to respective sides of the main roller, wherein coupling grooves are formed on opposing surfaces of the fixing plates to fix respective ends of the vacuum bars.

3. The embossing molding device according to claim 1, wherein the embossing roller is loosely fitted onto an outer circumferential surface of the vacuum bar assembly to allow replacement of the embossing roller when the air feeder is not in operation.

4. The embossing molding device according to claim 1, wherein the water cooler comprises first cooling water pipes provided longitudinally inside the vacuum bars to circulate cooling water fed from a cooling water feeder; and
second cooling water pipes provided inside the main roller and connected to the first cooling water pipes.

5. An apparatus for manufacturing artificial leather, comprising an embossing molding unit for forming an embossed pattern on an upper surface of a skin layer of a foam-molded semi-finished product by performing adsorption molding, wherein the embossing molding unit comprises the embossing molding device of claim 1.

6. The apparatus according to claim 5, further comprising, at a position ahead of the embossing molding unit, a surface treatment unit for forming a surface treatment layer on an upper surface of the skin layer.

7. The apparatus according to claim 6, wherein the surface treatment unit and the embossing molding unit are arranged in line.

8. The apparatus according to claim 6, further comprising:
at positions ahead of the surface treatment unit,
a first molding unit for forming a pre-foam layer or a foam layer;
a second molding unit for forming the skin layer;
a back layer lamination unit for laminating woven fabric or nonwoven fabric on a lower surface of the pre-foam layer or the foam layer to form a back layer; and
a skin layer lamination unit for laminating the skin layer on an upper surface of the pre-foam layer or the foam layer.

9. The apparatus according to claim 8, wherein, when the pre-foam layer is formed by the first molding unit, the apparatus further comprises a foam molding unit for forming the foam layer by foaming, at a certain magnification, the pre-foam layer comprising a foaming agent while passing, through an oven, a semi-finished product on which the skin layer is laminated.

10. The apparatus according to claim 6, further comprising, between the surface treatment unit and the embossing molding unit, an infrared light heating unit for heating a surface of a semi-finished product, on which the surface treatment layer is laminated, by radiating infrared light on the surface of the semi-finished product.

11. A method of manufacturing artificial leather, comprising:
step S1 of separately forming a pre-foam layer or a foam layer and a skin layer by molding;
step S3 of laminating woven fabric or nonwoven fabric on a lower surface of the prefoam layer or the foam layer to form a back layer;

step S5 of laminating the skin layer on an upper surface of the pre-foam layer or the foam layer on which the back layer has been formed;

step S7 of forming a surface treatment layer on an upper surface of the skin layer;

step S9 of radiating infrared light on a surface of the surface treatment layer; and step S11 of forming an embossed pattern on upper surfaces of the skin layer and the surface treatment layer of a semi-finished product heated by irradiation with infrared light by performing adsorption molding using the embossing molding device according to claim 1, and performing the adsorption molding using vacuum.

12. The method according to claim 11, wherein step S7 and step S11 are arranged in line.

13. The method according to claim 11, wherein, in step S1, the prefoam layer or the foam layer and the skin layer are formed through extrusion molding or calender molding.

14. The method according to claim 11, wherein, when the pre-foam layer and the skin layer are formed in step S1, the method further comprises, after step S5, step S6 of foaming the pre-foam layer to form the foam layer.

15. The method according to claim 11, wherein, in step S9, radiation of infrared light is performed at a temperature of 150 to 180° C. for 5 to 15 seconds.

16. The method according to claim 11, wherein a processing speed of the semifinished product is 13 to 17 m/min, and, in step S9, a length of a zone irradiated with infrared light corresponding to the processing speed is 3 to 4 m.

17. The method according to claim 11, wherein step S11 is performed at a temperature of 150 to 190° C. under a pressure of 0.02 to 0.08 MPa.

\* \* \* \* \*